(12) United States Patent
Wai

(10) Patent No.: US 7,789,922 B1
(45) Date of Patent: Sep. 7, 2010

(54) CYCLONIC CHAMBER FOR AIR FILTRATION DEVICES

(76) Inventor: Lau Ying Wai, Room 707, 7th Floor Block J, Telford Garden, Kowloon Bay, Kowloon (HK)

( * ) Notice: Subject to any disclaimer, the term of this patent is extended or adjusted under 35 U.S.C. 154(b) by 0 days.

(21) Appl. No.: 12/576,404

(22) Filed: Oct. 9, 2009

Related U.S. Application Data

(63) Continuation-in-part of application No. 12/800,569, filed on Apr. 9, 2009.

(51) Int. Cl.
*B01D 50/00* (2006.01)
(52) U.S. Cl. .................. 55/337; 55/420; 55/DIG. 3; 15/352; 15/353
(58) Field of Classification Search ............ 55/337, 55/420, DIG. 3; 15/352, 353
See application file for complete search history.

(56) References Cited

U.S. PATENT DOCUMENTS

| | | | |
|---|---|---|---|
| 4,682,384 A | | 7/1987 | Prahl et al. |
| 5,935,279 A | * | 8/1999 | Kilstrom ................. 55/337 |
| 6,125,498 A | * | 10/2000 | Roberts et al. ............. 15/320 |
| 6,231,647 B1 | * | 5/2001 | Cheng ..................... 96/226 |
| 6,434,785 B1 | * | 8/2002 | Vandenbelt et al. ......... 15/344 |
| 6,687,952 B1 | * | 2/2004 | Mohan, Jr. ............... 15/353 |
| 7,398,578 B2 | * | 7/2008 | Lee ...................... 15/327.2 |
| 7,507,269 B2 | * | 3/2009 | Murphy et al. ............. 55/337 |
| 7,547,338 B2 | * | 6/2009 | Kim et al. ................. 55/345 |
| 2002/0170432 A1 | * | 11/2002 | Cartellone ................ 95/268 |
| 2006/0090290 A1 | | 5/2006 | Lau |
| 2007/0271724 A1 | | 11/2007 | Hakan et al. |

FOREIGN PATENT DOCUMENTS

| | | |
|---|---|---|
| CN | 1636496 | 12/2003 |
| CN | 1626025 | 8/2008 |
| JP | 2003250729 | 12/2004 |
| JP | 2007167451 | 7/2007 |
| WO | WO2007084543 | 7/2007 |

* cited by examiner

*Primary Examiner*—Jason M Greene
*Assistant Examiner*—Dung Bui
(74) *Attorney, Agent, or Firm*—Roy Kiesel, a PLC

(57) ABSTRACT

A cyclonic chamber for use in air filtration devices. The chamber includes an apex opposite a base with sidewalls extending therebetween. The cyclonic chamber is preferably parabolic in cross-section or tubular with a hemi-spherical cap. The base contains an outflow passage and a conical filter extending therefrom. An inflow passage is provided proximate the apex. The inflow and outflow passages are parallel but not aligned. The chamber interior is smooth. The smooth interior and offset relationship of the inflow and outflow passages causes air to take a cyclonic path between the inflow passage and the filter. Debris in the airstream is pushed outward—away from the filter—by centripetal force. Eddies form proximate the base. Debris escapes the airstream there, where it either remains or, depending upon the chamber's orientation relative to gravity, falls back into the airflow where it is again directed away from the filter.

15 Claims, 13 Drawing Sheets

PRIOR ART

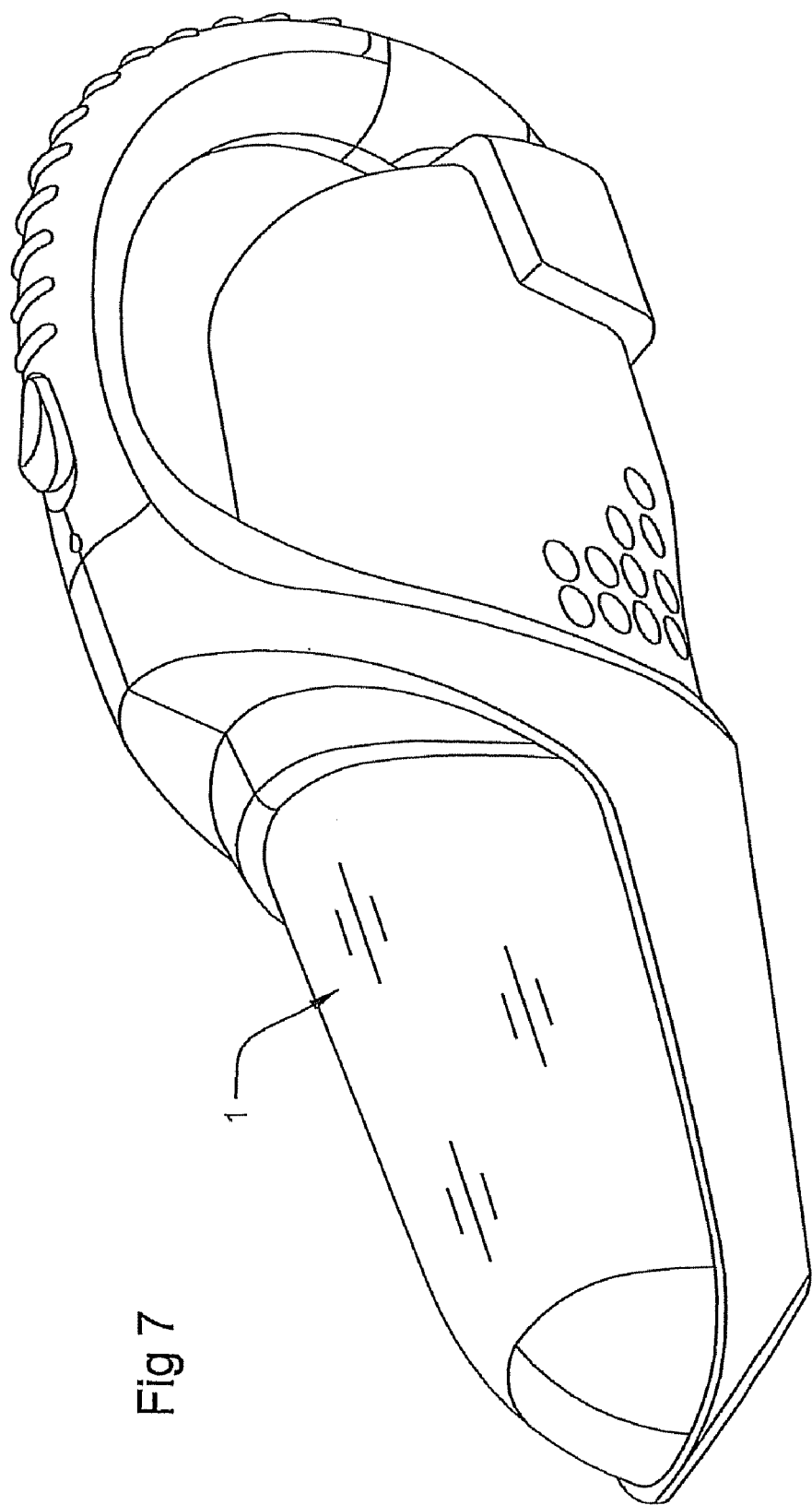

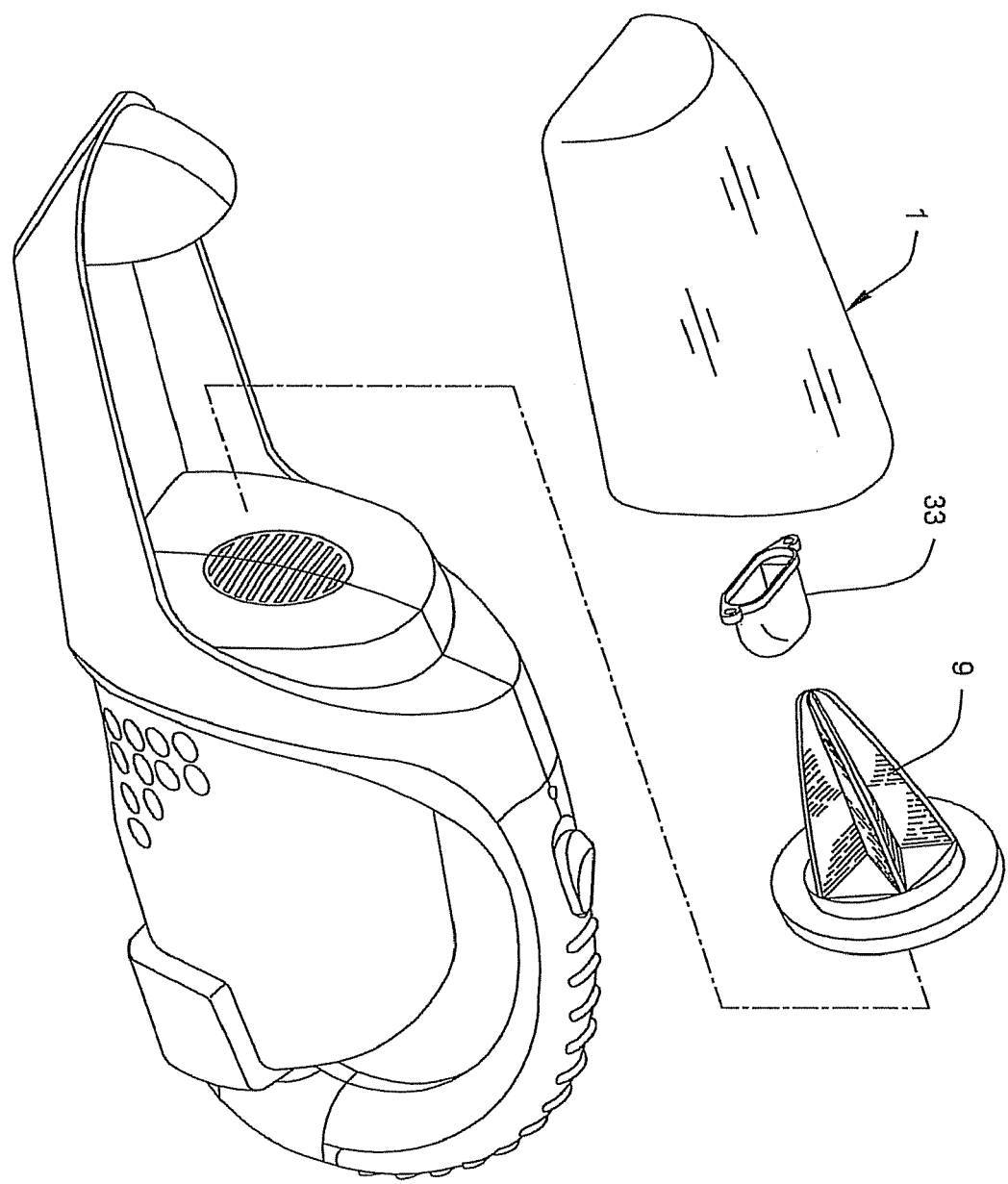

CYCLONIC CHAMBER FOR AIR FILTRATION DEVICES

CROSS-REFERENCE TO RELATED APPLICATIONS

This application is a continuation-in-part of pending U.S. patent application Ser. No. 12/800,569, filed Apr. 9, 2009 which is hereby incorporated by reference in its entirety.

BACKGROUND OF THE INVENTION

1. Field of the Invention

The invention relates to vacuums in general and to cyclonic vacuums in particular.

2. Prior Art

Cyclonic vacuums are well know in the art. For example, U.S. Pat. No. 4,373,228 to Dyson discloses a cyclonic vacuum. Such vacuums offer advantages over traditional vacuums in that they either require no conventional filter or, more commonly, the cyclonic action keeps dust and dirt away from the conventional filter, thereby preventing it from clogging. This tends to both prolong the life of the conventional filter and prevent a decline in the overall strength of the vacuum as the filter clogs. However, many cyclonic designs impede vacuum strength. In most cyclonic designs, cyclonic motion is imparted by configuring the air to enter the cyclonic chamber at a significant angle relative to the path the air exits the cyclonic chamber. This angular or tangential entry creates a vortex within the cyclonic chamber. However, the hard turn in the air path necessarily slows the flow of air as it enters the cyclonic chamber. Slowing the flow of air lessens the strength of the vacuum. As a result and with all other things being equal, the suction of most cyclonic vacuums will be weaker than the suction provided by a conventional vacuum with a similar motor and fan. The length of the passage through which air must pass increases resistance, slowing the air and weakening the strength of the vacuum. Thus, the addition of attachments to any vacuum will reduce its strength. This weakening is enhanced when the attachment is added to a cyclonic vacuum wherein the cyclonic flow is induced by tangential entry to the cyclonic chamber.

In other prior art cyclonic designs, cyclonic motion is imparted via a curved nozzle. These vacuums have their own associated problems. In such vacuums, the air inflow passage leads into a nozzle which extends into the cyclonic chamber. As air enters the nozzle and into the cyclonic chamber, the curvature of the nozzle causes the air to hit the side of the wall at an angle, creating cyclonic motion. However, because the body of the nozzle itself extends into the cyclonic chamber, it acts as a physical obstruction to the cyclonic motion of the air. This in turn substantially inhibits and/or destroys the cyclonic motion and slows the flow of the air. As a result, the suction strength of the vacuum is weakened.

In view of the foregoing, a cyclonic vacuum meeting the following objectives is desired.

OBJECTS OF THE INVENTION

It is an object of the invention to provide a cyclonic vacuum.

It is another object of the invention to provide a cyclonic vacuum comprising an improved inflow nozzle that does not act as a physical obstruction to the cyclonic motion of air.

It is another object of the invention to provide a cyclonic vacuum in which suction is optimized.

It is still another object of the invention to provide a cyclonic vacuum wherein air does not slow substantially upon entering the cyclonic chamber.

It is yet another object of the invention to provide a cyclonic vacuum capable of receiving a variety of vacuum attachments.

It is still another object of the invention to provide a cyclonic vacuum wherein the path of air entering and exiting the cyclonic chamber are substantially parallel.

It is another object of the invention to provide a cyclonic vacuum wherein the interior of the cyclonic chamber is substantially smooth.

It is still another object of the invention to provide a cyclonic vacuum wherein the interior of the cyclonic chamber is substantially free of obstructions.

It is yet another object of the invention to provide a cyclonic chamber that can be used in a variety of vacuums.

SUMMARY OF THE INVENTION

The invention is a cyclonic chamber for use in vacuums and other air filtration devices. In a first preferred embodiment, the cyclonic chamber comprises an apex opposite a base with sidewalls extending therebetween. The cyclonic chamber will preferably be generally parabolic in cross-section or generally tubular in cross-section with a hemi-spherical cap at the apex end. The base contains an outflow passage. A conical filter extends from the outflow passage. The filter and outflow passage are configured so that during operation air cannot pass out of the cyclonic chamber without passing through the filter. An inflow passage is also provided at the apex end of the chamber. The inflow passage and the outflow passage are parallel but not aligned. The interior of the cyclonic chamber is substantially smooth. The smooth interior walls of the cyclonic chamber in combination with the offset relationship of the inflow and outflow passages will cause the air in the chamber to take a cyclonic path between the inflow passage and the filter. Debris entrained in the airflow will be pushed to the exterior of the chamber—away from the filter—by centripetal force. Eddies will form in the cyclonic path proximate the base of the chamber. Debris will escape the airflow there. Debris that escapes will either remain at the base or, depending upon the orientation of the chamber relative to gravity, fall back into the airflow where it will again be directed away from the filter.

In another preferred embodiment of the invention, the construction of the cyclonic chamber will be similar to the one discussed above, with the following deviations: the curved chamber will comprise a recessed cavity. In construction, the recessed cavity will be situated external to the cyclonic airflow path within the chamber. Positioned within this cavity will be a curved inflow nozzle, said nozzle in turn being in communication with the inflow passage. As the nozzle is positioned outside of the air flow in the chamber, it will not act as a physical obstruction to the cyclonic motion of the air.

BRIEF DESCRIPTION OF THE DRAWINGS

FIG. 7 depicts a perspective view of a preferred embodiment of a hand held vacuum containing a preferred embodiment of the cyclonic chamber and curved nozzle of the present invention.

FIG. 8 is an exploded view of FIG. 7.

DETAILED DESCRIPTION OF THE INVENTION

Figure 1:
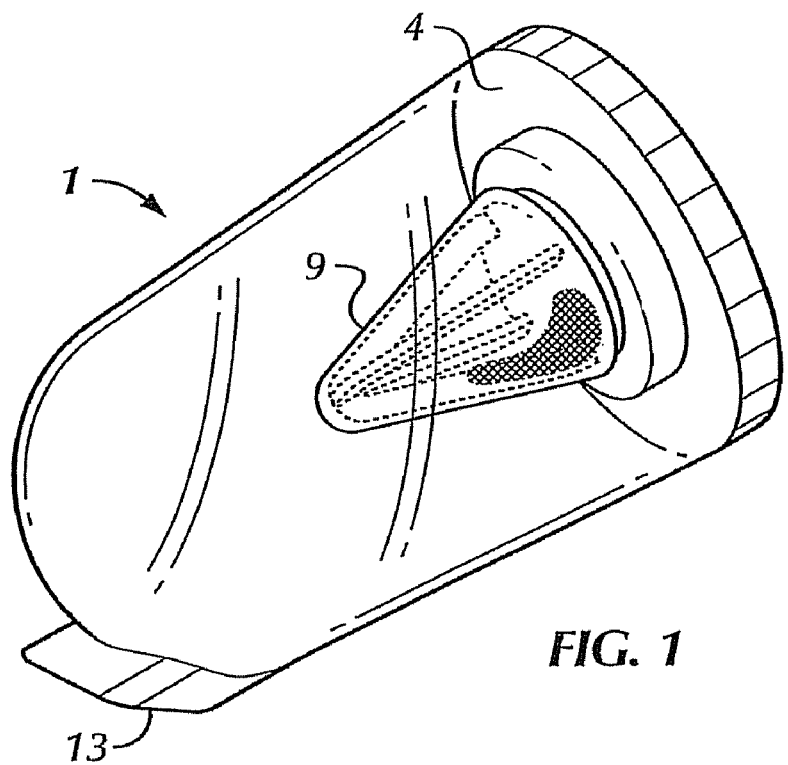
FIG. 1 is a perspective exterior view of a preferred embodiment of a cyclonic chamber.
Figure 2:
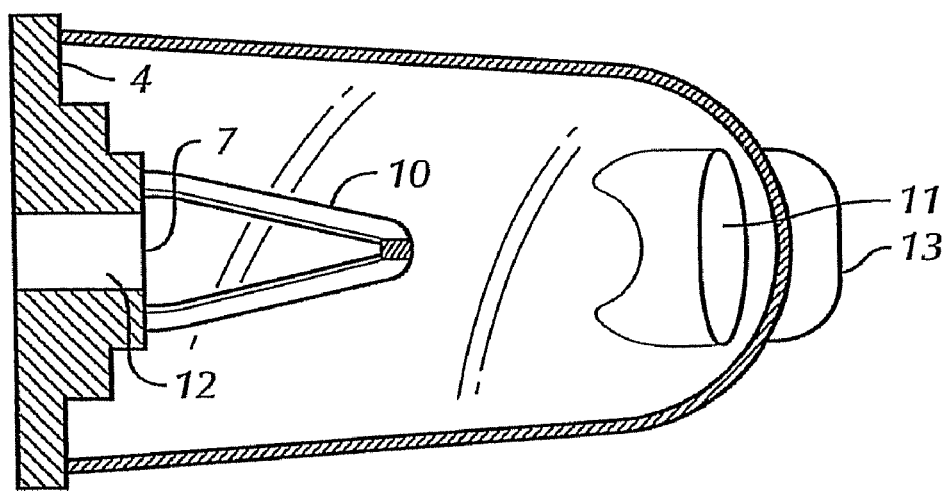
FIG. 2 is a cut-away top view of the cyclonic chamber of FIG. 1.
Figure 3:
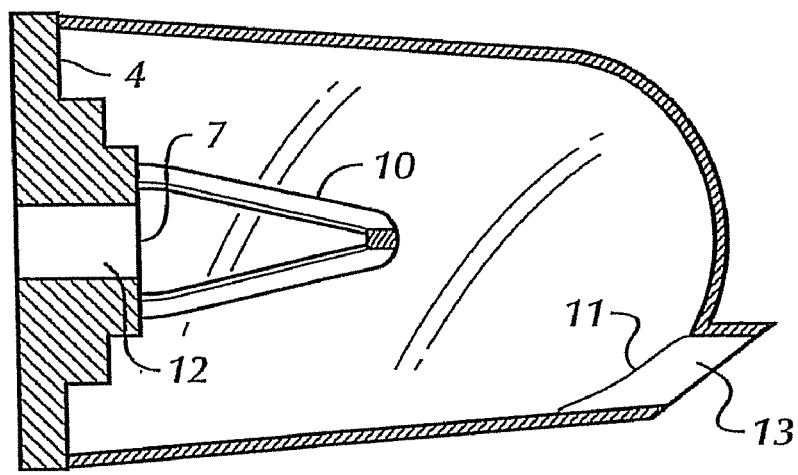
FIG. 3 is a cut-away side view of the cyclonic chamber of figure.
Figure 4:
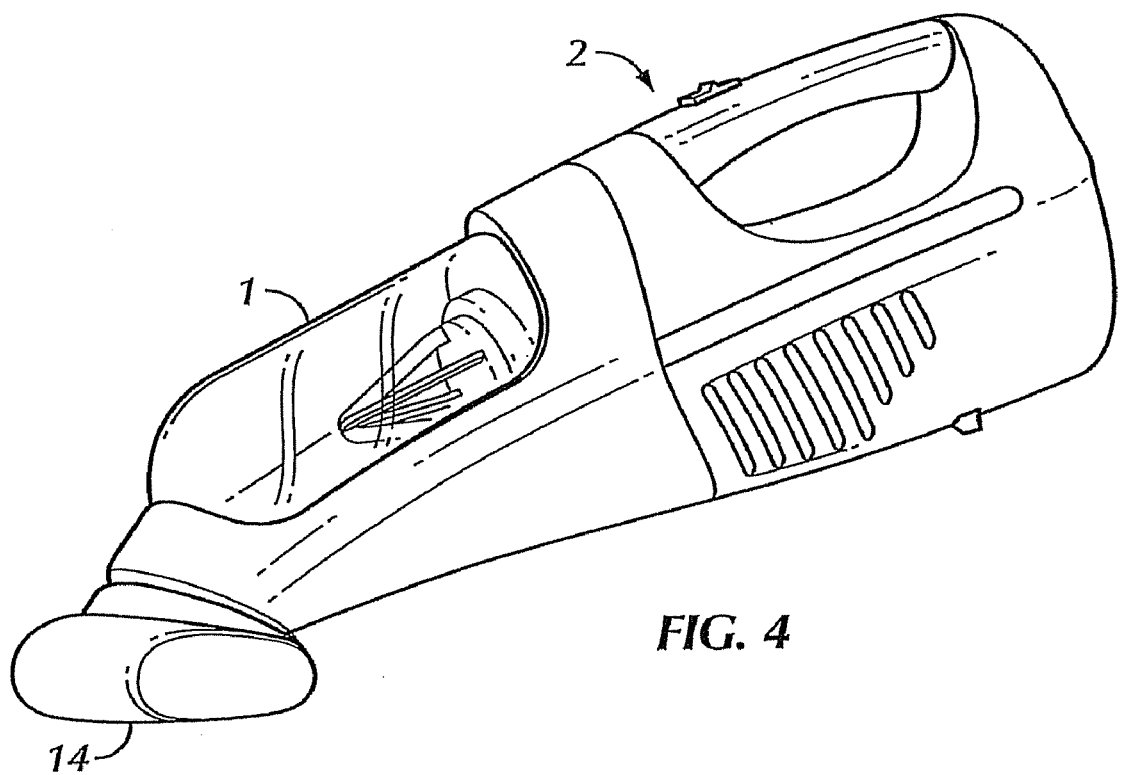
FIG. 4 is a perspective view of a hand-held vacuum containing a preferred embodiment of a cyclonic chamber.
Figure 5:
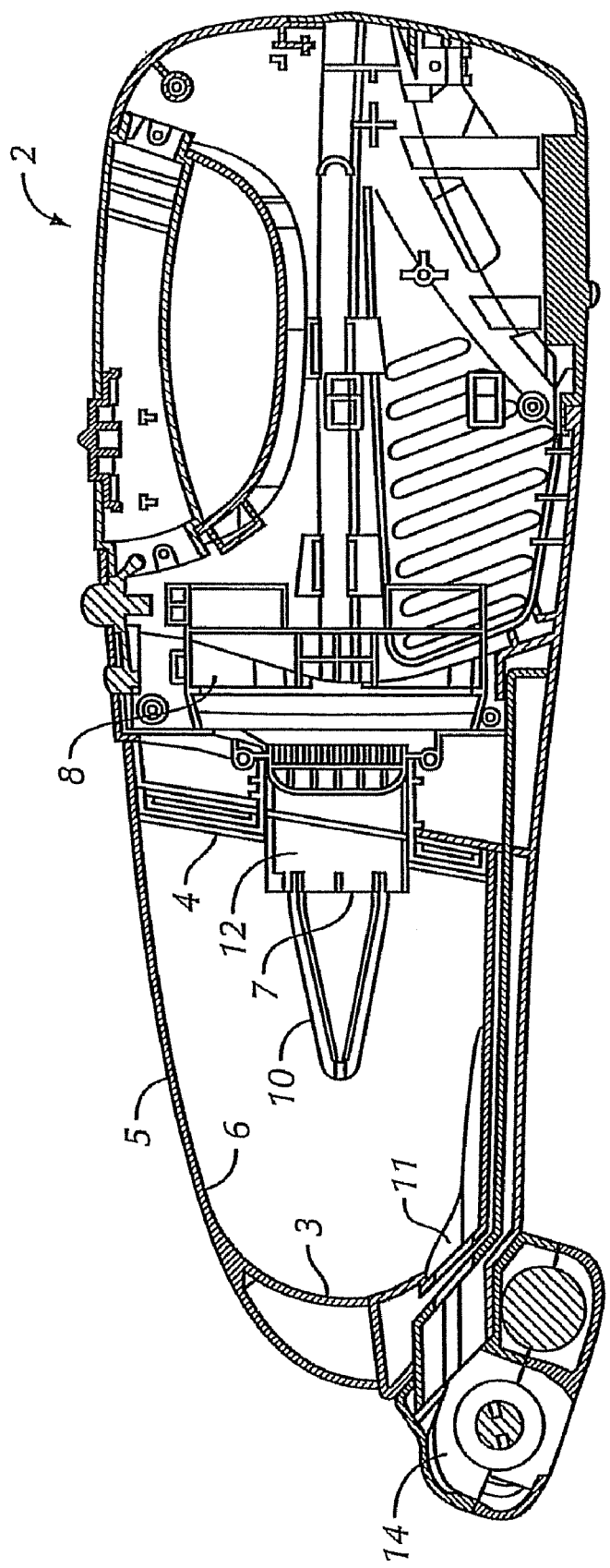
FIG. 5 is a cut-away side view of another hand-held vacuum containing a preferred embodiment of a cyclonic chamber.

The invention comprises a cyclonic chamber 1 for a vacuum 2. A first preferred embodiment of chamber 1 will be discussed, followed by a second preferred construction. In a first preferred construction, cyclonic chamber 1 has an apex 3 opposite a base 4 and walls 5 extending therebetween. Cyclonic chamber 1 is either generally parabolic in cross section or generally tubular with a hemi-spherical cap at the apex end. The interior surface 6 of walls 5 and apex 3 are substantially smooth and free of obstructions. Extending inwardly from base 4 is an outflow passage 12, which terminates in an outflow aperture 7 that allows air to exit cyclonic chamber 1. Outflow passage 12 will preferably separate outflow aperture 7 from base 4. In the preferred embodiment, outflow aperture 7 will lead to a fan 8 which will generate suction for vacuum 2. Positioned over outflow passage 12 and outflow aperture 7 and extending into cyclonic chamber 1 is a filter 9. Filter 9 will preferably be conical or parabolic in cross section. The exterior of filter 9 will also preferably be substantially smooth. Any supporting ribs 10 and the like will preferably be on the interior of filter 9. Outflow passage 12, outflow aperture 7 and filter 9 are preferably centrally positioned in cyclonic chamber 1. Filter 9 should be configured and positioned so that air cannot pass from cyclonic chamber 1 to outflow passage 12 without passing through filter 9.

An inflow aperture 11 is provided proximate apex 3. Inflow aperture 11 is preferably elliptical in cross section. It will be appreciated that although inflow aperture 11 is described herein as if it were a two dimensional opening, it will, of course, have some length, such that inflow aperture 11 is in fact a passage, namely inflow passage 13. These passages—inflow passage 13 and outflow passage 12—are preferably substantially parallel to, but offset from, one another.

Air entering cyclonic chamber 1 via inflow aperture 11 must travel from inflow aperture 11 to outflow aperture 7. The smooth curvature of walls 5 will entrain air and debris that enters cyclonic chamber 1 in a curving path. This path will follows walls 5 from inflow aperture 11 to outflow aperture 7, imparting a cyclonic flow pattern to the air within cyclonic chamber 1. Because air entering cyclonic chamber 1 is able to change directions gradually across the length of cyclonic chamber 1 instead of changing immediately upon entry into cyclonic chamber 1, the flow of air is not constricted as air enters cyclonic chamber 1 and airflow remains substantially laminar. This allows air to flow through cyclonic chamber 1 without slowing substantially, which in turn allows more air to flow through vacuum 2 per unit time, thereby enhancing the strength of vacuum 2.

As noted above, the smooth curvature of walls 5 and, to a lesser degree, apex 3 will cause the air and debris entering cyclonic chamber 1 to follow a cyclonic pattern as they move around cyclonic chamber 1 from inflow aperture 11 to outflow aperture 7. Centripetal force caused by this cyclonic path will push dirt and debris in the airstream outward toward walls 5 and away from filter 9. This will keep dirt and debris from clogging filter 9, increasing its life span while maintaining the strength of vacuum 2.

The lack of obstructions on walls 5 and apex 3 will prevent eddies from forming in these areas. Similarly, the smooth outer surface of filter 9 will prevent eddies from forming along its surface. This will serve to maintain laminar cyclonic flow in these areas. However, base 4 of cyclonic chamber 1 is not obstruction free. It is preferably provided with relatively sharp corners where walls 5 meet base 4 and where outflow passage 12 extends from base 4. Other obstacles may be provided there as well. These will cause eddies to form near base 4. Debris will fall out of the cyclonic airflow in these eddies. Depending upon the position of cyclonic housing 1 relative to gravity, debris falling out of the airstream will either fall onto base 4 or fall back into the airstream. It will be noted that debris falling onto base 4 will be displaced from outflow aperture 7 and filter 9. For debris deposited onto base 4 to travel to filter 9, it would have to pass through the cyclonic airstream, which will tend to drive debris away from filter 9 via centripetal force, as discussed above. Cyclonic chamber 1 should open, preferably at or proximate to base 4, in order to allow any dust and debris that have been collected in cyclonic chamber 1 to be discarded.

In the preferred embodiment, fan 8 is positioned immediately downstream from cyclonic chamber 1. However, it will be appreciated that multiple cyclonic chambers may be provided in sequence, such that one or more cyclonic chambers are provided downstream from cyclonic chamber 1, and a fan is provided downstream from all of the cyclonic chambers.

In the preferred embodiment, the cyclonic chamber 1 is shown in a hand held vacuum. However, it will be appreciated that cyclonic chamber 1 could be utilized in any conventional vacuum system or air filtration system.

In a second preferred embodiment of the invention, chamber 1 will be constructed in substantially the same manner as discussed above i.e. chamber 1 will be defined by a base 4, apex 3, and a plurality of sidewalls 5 in which a cyclonic airflow will be generated. However, in this embodiment, sidewalls 5 will contain a recess aperture 5a and a recessed cavity 34 will depend from sidewalls 5 at recess aperture 5a. As will be discussed further below, recessed cavity 34 will house an inflow nozzle 33 and the positioning and construction of cavity 33 will keep nozzle 33 substantially exterior to the cyclonic airflow path within chamber 1. In a preferred embodiment, cavity 34 will be substantially square or rectangular in shape.

Figure 6A:
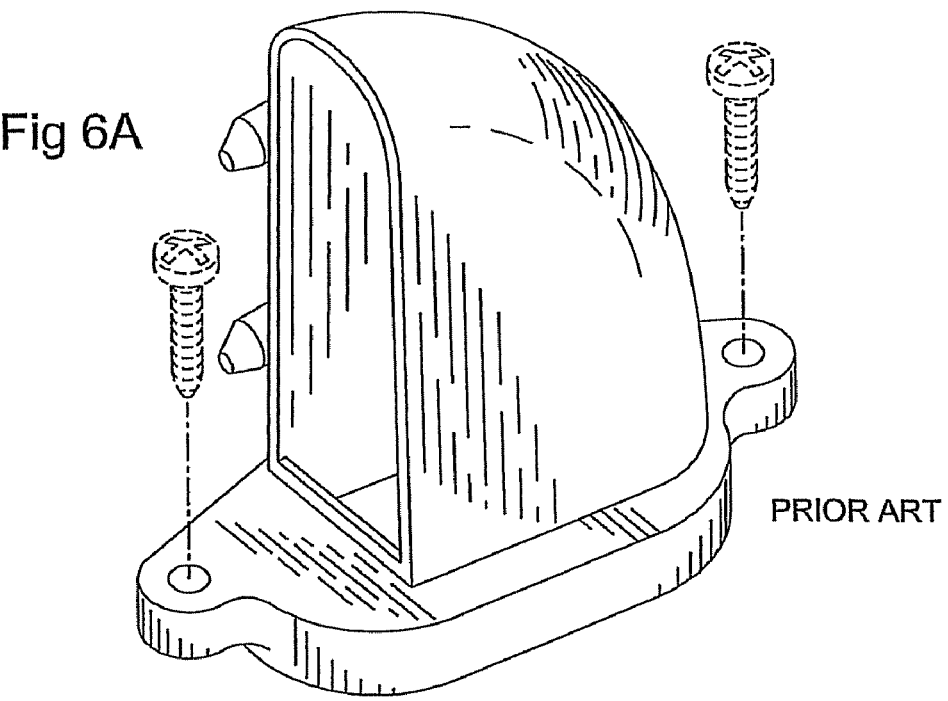
FIG. 6A depicts a conventional prior art curved nozzle.
Figure 13:
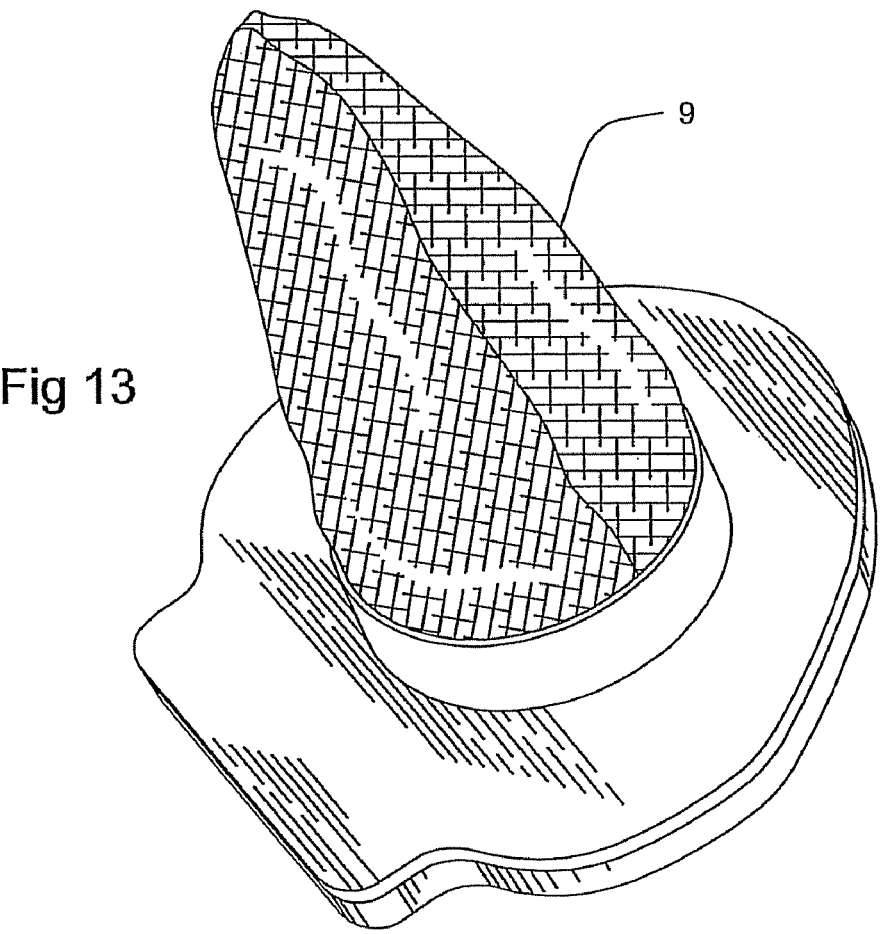
FIG. 13 is perspective view of one preferred embodiment of a filter capable of being utilized in the cyclonic chamber.

Continuing with a discussion of the second preferred embodiment of the invention, inflow nozzle 33 will be in communication with inflow passage 13. Inflow nozzle 33 will further comprise a curved body region 33a having a top surface 33e. Inflow nozzle 33 should substantially fill cavity 34, and should further be positioned such that top surface 33e of nozzle 33 substantially closes the recess aperture 5a of sidewalls 5 to prevent air from entering into recessed cavity 34. Inflow nozzle 33 will further terminate into an aperture 33b covered by a directional valve 33c configured to release the air into cyclonic chamber 1 at an angle that is substantially tangential to the curvature of sidewalls 5 of chamber 1. In a preferred embodiment, directional valve 33c will comprise a rubber flap 33d. Rubber flaps are known in the art and often utilized with curved nozzles. See FIG. 6A. However, the placement and angled opening of rubber flap 33d is part of the novelty of the present invention, as will be discussed further below.

In use, cyclonic chamber 1 with recessed cavity 34 may be utilized with any hand held vacuum cleaner body. However, it is to be appreciated that vacuum source need not be limited to vacuum cleaners, and that chamber 1 may be utilized with any appropriate high velocity air purification system.

In operation, air will enter cyclonic chamber 1 parallel to inflow passage 13 and then into body region 33a of inflow nozzle 33. A cyclonic path will be generated as follows. The force of the air moving through body region 33a of nozzle 33 will cause valve 33c of nozzle 33 to become partially and directionally opened, such that air will exit nozzle 33 at an angle that is substantially tangential to the curvature of walls 5 of chamber 1. The tangential approach of the air to sidewalls 5 will cause the air to travel in a cyclical path around chamber 1 and across top surface 33e of nozzle 33. Thus, the position of nozzle 33 within recessed cavity 34 of chamber 1, the angled partial opening of valve 33c, and the curvature of sidewalls 5 are all preferred features of the invention that, in conjunction with each other, impart a cyclonic flow pattern to the air within chamber 1. After such a cyclonic pattern has been created, nozzle 33 will only minimally interfere with the flow pattern. As discussed above, the positioning and construction of recessed cavity 33 will keep nozzle 33 substantially exterior to the cyclonic airflow path within chamber 1. Furthermore, and as also discussed above, top surface 33e of nozzle 33 will substantially prevent air from entering into recessed cavity 34. In this fashion, the cyclonic air flow pattern will be maintained. To further enhance the cyclical motion of the air, any gaps between nozzle 33 and walls of chamber 5 will preferably be minimized or eliminated to prevent eddies from forming in these areas and to maintain laminar cyclonic flow.

Figure 6B:
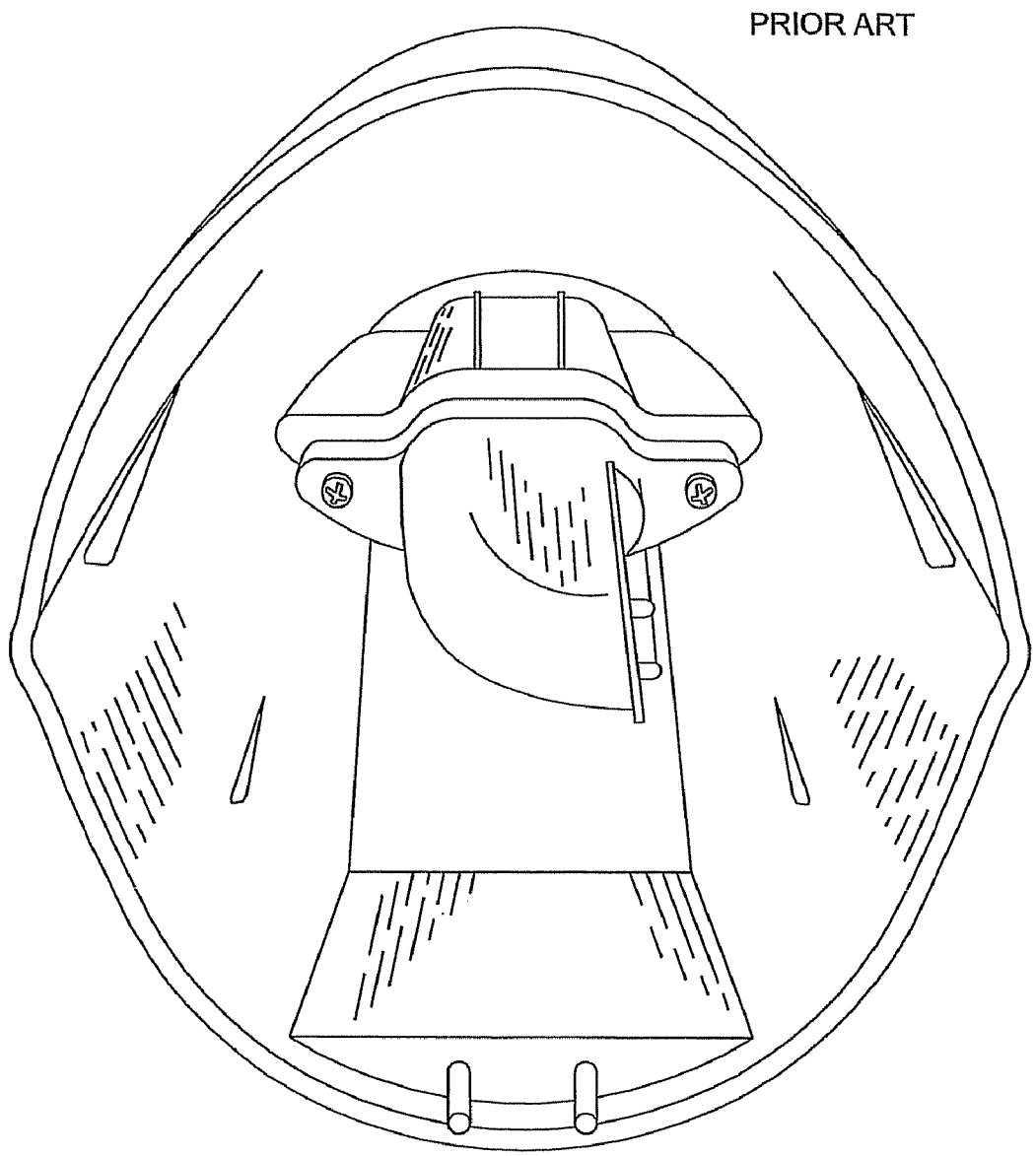
FIG. 6B depicts an internal view of a prior art cyclonic chamber, depicting the conventional positioning of the curved nozzle of FIG. 6A.
Figure 9:
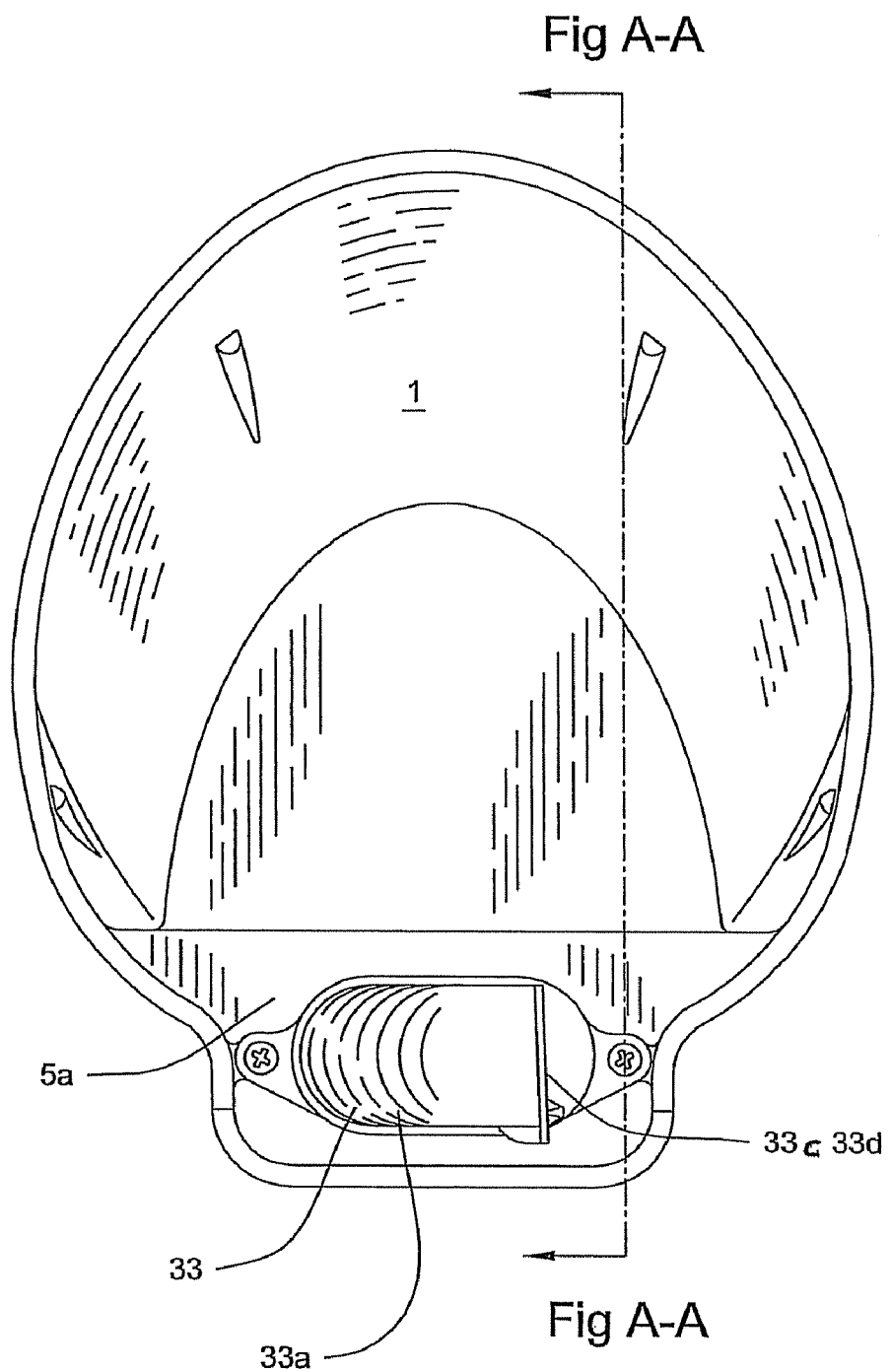
FIG. 9 is an interior view of a preferred embodiment of the cyclonic chamber.
Figure 9A:
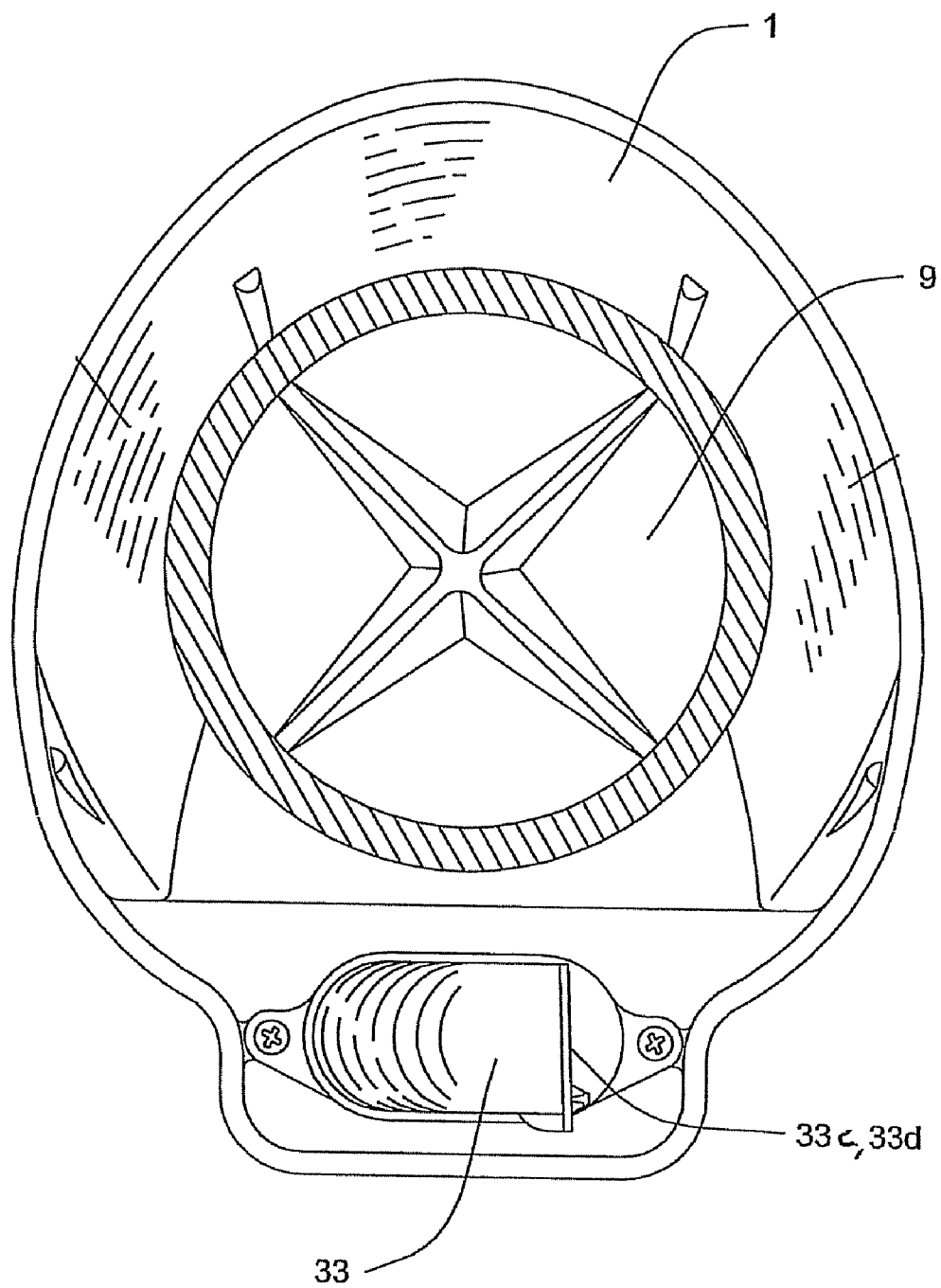
FIG. 9A is an interior view of a preferred embodiment of the cyclonic chamber depicting the nozzle flap in the closed position.
Figure 9B:
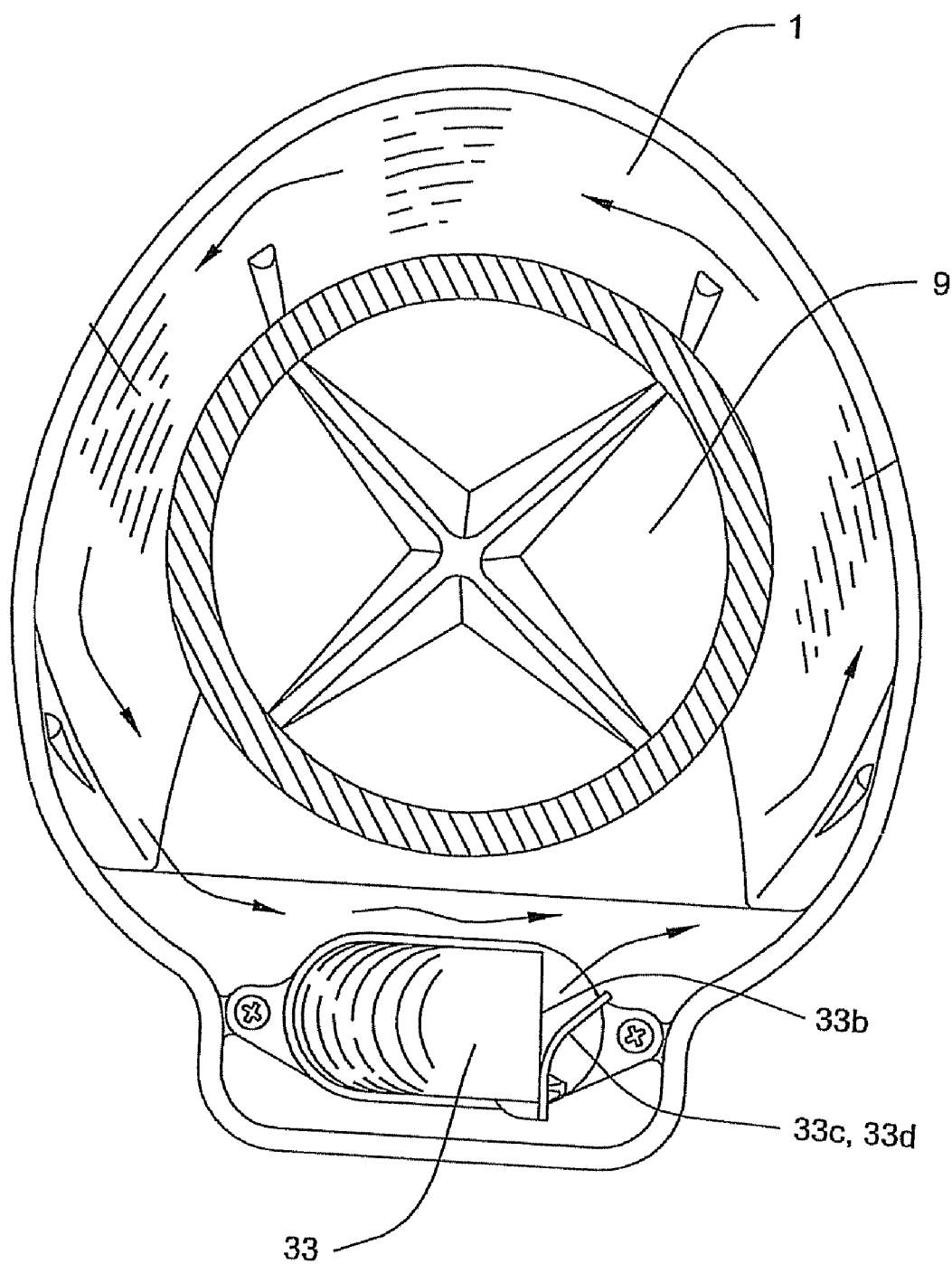
FIG. 9B is an interior view of a preferred embodiment of the cyclonic chamber, depicting the nozzle flap in the slightly open and angled position, with the arrows further depicting the cyclonic path.
Figure 10:
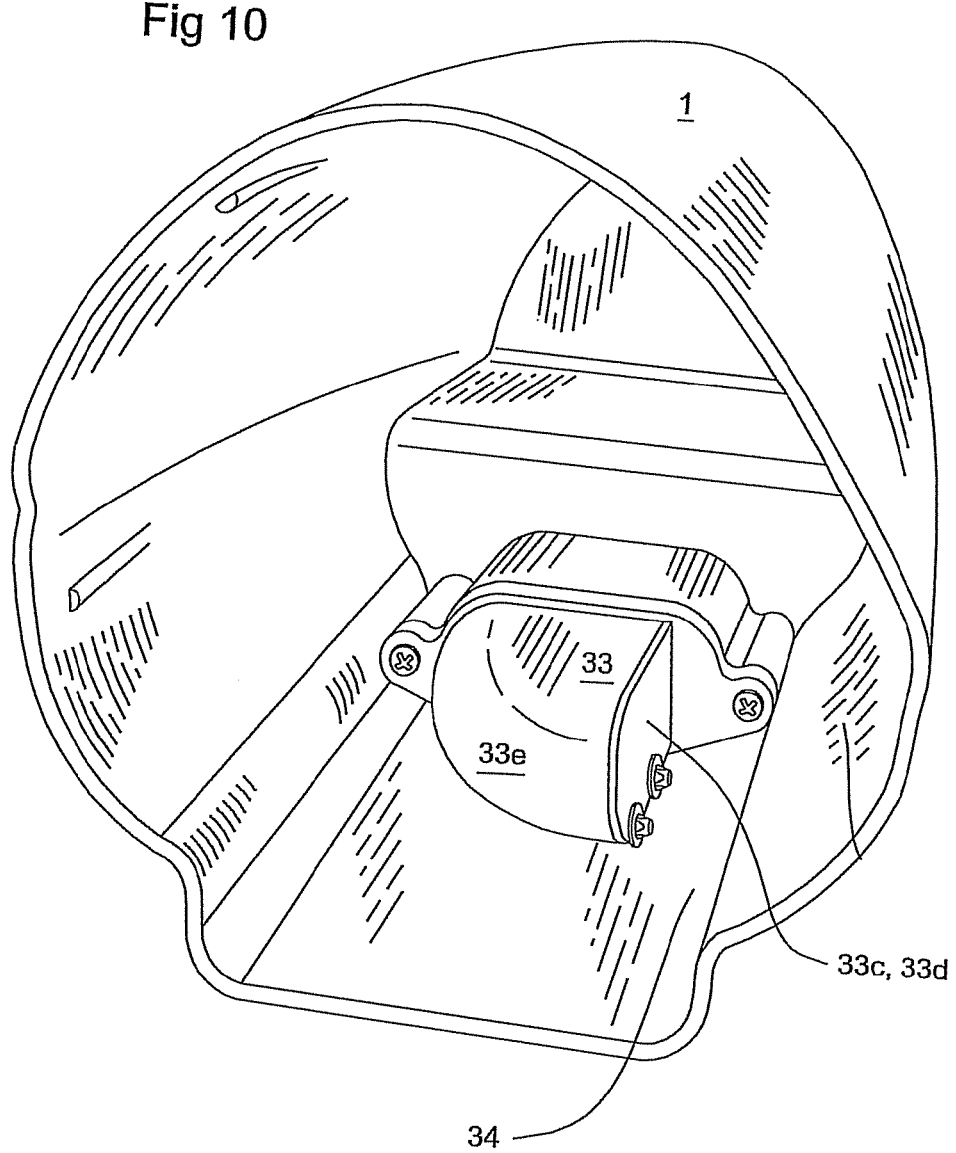
FIG. 10 is a perspective rear-end view of a preferred embodiment of the cyclonic chamber.
Figure 11:
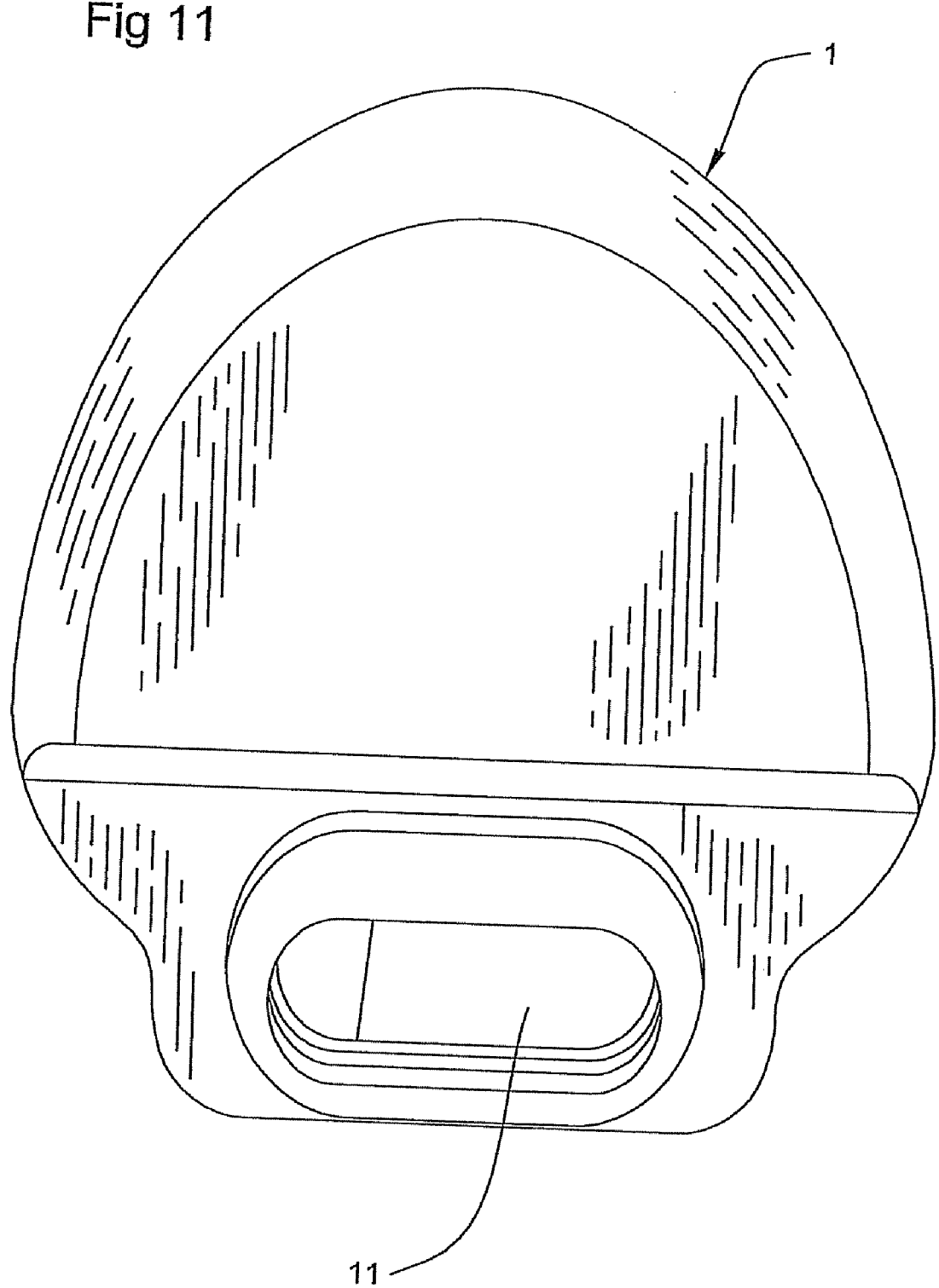
FIG. 11 is a front end view of a preferred embodiment of the cyclonic chamber.
Figure 12:
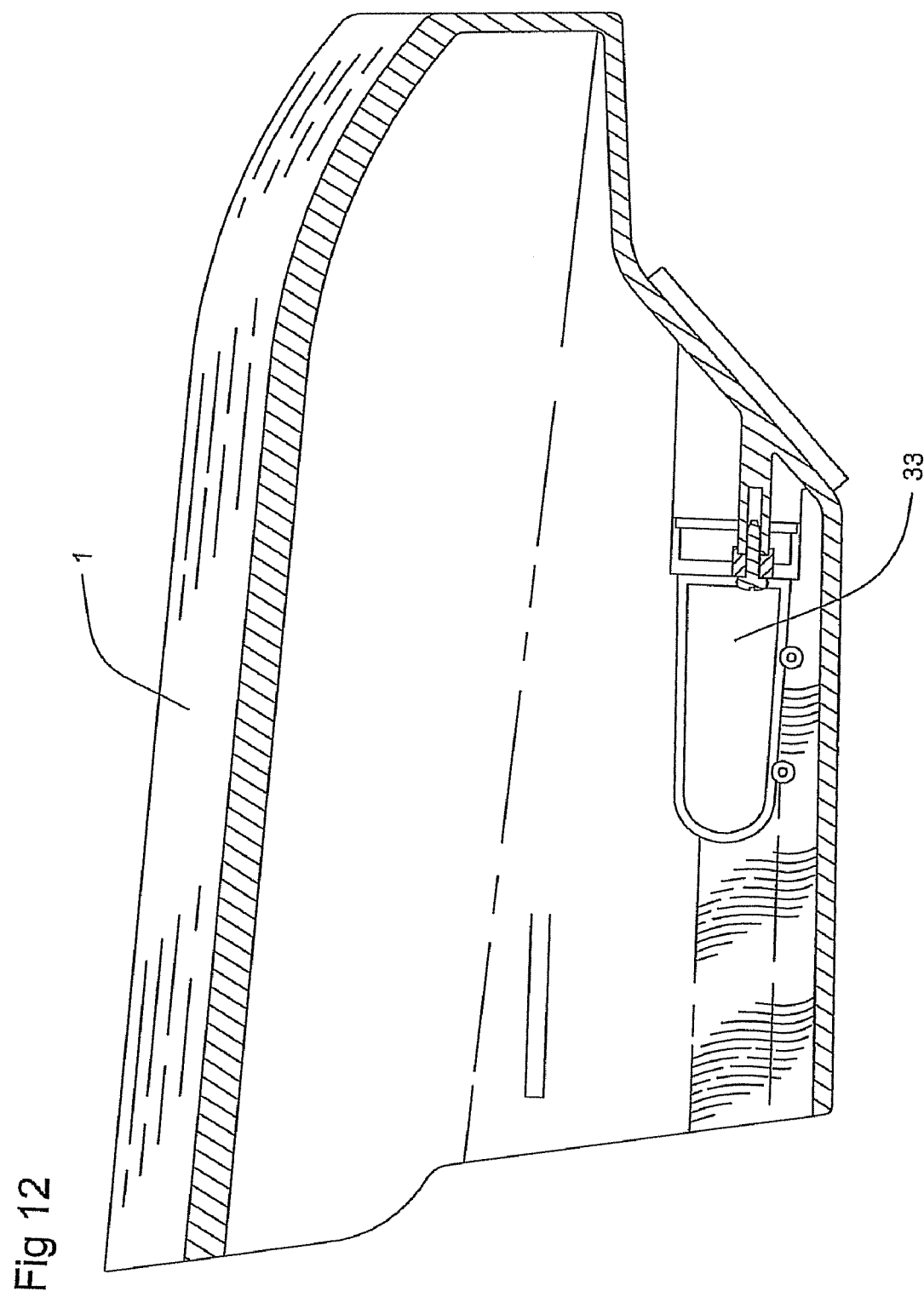
FIG. 12 is a cross-sectional view of a preferred embodiment of the cyclonic chamber, taken along lines A-A of FIG. 9.

This above-discussed preferred construction of chamber 1 is in contrast to prior art practices, whereby, as mentioned above, the body of nozzle 33 is not kept out of the airflow and thus acts as a physical obstruction to the cyclonic motion of the air. See FIG. 6B. Thus, by keeping the interior surface 6 of sidewalls 5 and apex 3 substantially smooth and free of obstructions and by eliminating any gaps between nozzle 33 and sidewalls 5 a cyclical motion can be more efficiently maintained around filter 9. This in turn will prevent dust, debris, and other particles from falling into filter 9 and clogging the same. In this manner, the integrity and life of filter 9 will be preserved.

Filter 9 may be identical to the one discussed previously, alternatively filter 9 may comprise pleats 9a to provide for an increased surface area for the passage of air, thereby resulting in a more effective cleaning.

Any variety of conventional vacuum attachments 14 may be added upstream of inflow passage 13. Attachments 14 include crevice tools, fixed brushes, and motorized rotational brushes. The addition of any such tool to a vacuum will necessarily weaken the strength of the vacuum because they increase the distance between the exterior of the vacuum and the vacuum source—i.e., the fan. However, because cyclonic chamber 1 is more efficient than comparable cyclonic filters, there will be more vacuum suction available in a vacuum containing cyclonic chamber 1. The net result is that a vacuum containing cyclonic chamber 1 should be better able to provide the necessary suction to effectively operate an attachment than a comparable vacuum containing a convention cyclonic filter.

Although the invention has been described in terms of its preferred embodiment, other embodiments will be apparent to those of skill in the art from a review of the foregoing. Those embodiments as well as the preferred embodiments are intended to be encompassed by the scope and spirit of the following claims.

The invention claimed is:

1. A cyclonic dust collection chamber for use with a vacuum source wherein the chamber comprises:
   a base opposite an apex and a plurality of sidewalls extending therebetween, the apex and sidewalls having interior surfaces, wherein the interior surfaces are substantially smooth;
   an outflow passage;
   an inflow passage extending from an inflow aperture contained in the sidewalls proximate the apex and distal from the base, wherein the sidewalls of the chamber contain a recess aperture;
   the chamber further comprising a recessed cavity depending from the sidewalls at the recess aperture;
   an inflow nozzle positioned in the cavity, wherein the inflow nozzle is in communication with the inflow passage;
   the inflow nozzle further having a curved body with a top surface, wherein the curved body terminates in an aperture covered by a directional valve configured to open at an angle selected to discharge air into the chamber in a direction substantially tangential to the curvature of the sidewalls;
   a filter positioned over the outflow passage whereby air exiting the chamber via the outflow passage must pass through the filter; and
   wherein the vacuum source is in operative fluid engagement with the outflow passage whereby operation of the vacuum source will draw air into the chamber via the inflow passage and inflow nozzle, whereby air will be discharged through the directional valve at the selected angle, whereby the air will travel in a cyclonic path around the sidewalls of the chamber and across the top surface of the nozzle, and wherein the recessed cavity is further configured to keep the inflow nozzle substantially exterior to the cyclonic path of the airflow in the chamber.

2. A cyclonic dust collection chamber for use with a vacuum source according to claim 1, wherein the recess aperture is substantially closed.

3. A cyclonic dust collection chamber for use with a vacuum source according to claim 2, wherein the top surface of the nozzle substantially closes the recess aperture.

4. A cyclonic dust collection chamber for use with a vacuum source according to claim 1 , wherein the directional valve comprises a rubber flap.

5. A cyclonic dust collection chamber for use with a vacuum source according to claim 1 wherein the recessed cavity is substantially square in shape.

6. A cyclonic dust collection chamber for use with a vacuum source according to claim 1 wherein the recessed cavity is substantially rectangular in shape.

7. A cyclonic dust collection chamber for use with a vacuum source according to claim 1 wherein the interior surfaces of the apex and the sidewalls are substantially free of aerodynamic obstructions.

8. A cyclonic dust collection chamber for use with a vacuum source according to claim 1 wherein the chamber is substantially parabolic in cross section.

9. A cyclonic dust collection chamber for use with a vacuum source according to claim 1 wherein the filter is substantially parabolic in cross section.

10. A cyclonic dust collection chamber for use with a vacuum source according to claim 9 wherein the filter has an exterior surface that is substantially smooth.

11. A cyclonic dust collection chamber for use with a vacuum source according to claim 1 wherein the filter is substantially conical.

12. A cyclonic dust collection chamber for use with a vacuum source according to claim 1 wherein the cyclonic dust collection chamber is contained with a vacuum cleaner.

13. A cyclonic dust collection chamber for use with a vacuum source according to claim 12 further comprising at least one vacuum attachment operatively and fluidly connected to the inflow passage.

14. A cyclonic dust collection chamber for use with a vacuum source according to claim 13 wherein the vacuum attachment is a motorized brush.

15. A cyclonic dust collection chamber for use with a vacuum source according to claim 1 wherein the filter comprises pleats.

\* \* \* \* \*